United States Patent
Lundequist et al.

(10) Patent No.: US 9,248,617 B2
(45) Date of Patent: Feb. 2, 2016

(54) TOOL AND METHOD FOR EXPANDING A PIPE END

(75) Inventors: Yngve Lundequist, Virsbo (SE); Hakan Persson, Virsbo (SE); Erika Sundqvist Byhlin, Virsbo (SE); Johan Backlund, Virsbo (SE)

(73) Assignee: UPONOR INNOVATION AB, Virsbo (SE)

( * ) Notice: Subject to any disclaimer, the term of this patent is extended or adjusted under 35 U.S.C. 154(b) by 431 days.

(21) Appl. No.: 13/816,781

(22) PCT Filed: Aug. 11, 2011

(86) PCT No.: PCT/EP2011/063817
§ 371 (c)(1),
(2), (4) Date: Feb. 13, 2013

(87) PCT Pub. No.: WO2012/022665
PCT Pub. Date: Feb. 23, 2012

(65) Prior Publication Data
US 2013/0140739 A1    Jun. 6, 2013

(30) Foreign Application Priority Data
Aug. 16, 2010 (EP) .................................... 10172913

(51) Int. Cl.
B29D 23/00 (2006.01)
B21D 41/02 (2006.01)
B21D 39/20 (2006.01)
B29C 57/04 (2006.01)

(52) U.S. Cl.
CPC .............. *B29D 23/001* (2013.01); *B21D 39/20* (2013.01); *B21D 41/02* (2013.01); *B21D 41/021* (2013.01); *B29C 57/04* (2013.01)

(58) Field of Classification Search
CPC .... B21D 41/02; B21D 41/021; B21D 41/026; B21D 41/028; B21D 39/20; B29C 57/04
See application file for complete search history.

(56) References Cited

U.S. PATENT DOCUMENTS

| 2,672,175 | A | * | 3/1954 | Howard | ........................... 72/393 |
| 5,046,349 | A | | 9/1991 | Velte | |
| 8,517,715 | B2 | * | 8/2013 | Thorson et al. | ............... 425/392 |
| 2006/0201228 | A1 | * | 9/2006 | Rothenberger | .................. 72/393 |
| 2008/0196468 | A1 | | 8/2008 | Tanner et al. | |

FOREIGN PATENT DOCUMENTS

DE    202008002266 U1 *  4/2008
EP    0417674          3/1991
(Continued)

*Primary Examiner* — Mark A Osele
(74) *Attorney, Agent, or Firm* — Occhiuti & Rohlicek LLP

(57) ABSTRACT

A pipe end is expanded by an expander tool (1) comprising a plurality of jaws (10), which are radially movable in relation to a center axis between a retracted position and expanded position. The jaws (10) when retracted are intended to be inserted into the pipe end. The jaws (10) have outer jaw surfaces which are intended for engagement with the inner surface of the pipe end and which lie adjacent to one another in the retracted position of the jaws (10). The tool (1) further comprises a piston (2) or a cone with a tapered end for moving the jaws (10) between said positions and means moving the piston (2) or the cone in a reciprocating manner in the axial direction for expanding the pipe end. The tool (1) further comprises support structures whereby the jaws (10) are supported in a circumferential direction in the expanded position. A method for expanding a pipe using such a tool is also disclosed.

10 Claims, 3 Drawing Sheets

(56) References Cited

FOREIGN PATENT DOCUMENTS

| EP | 0 682 758 | 8/1998 |
| EP | 1 118 401 | 7/2001 |
| EP | 2 090 385 | 8/2009 |
| WO | WO95/10000 | 4/1995 |
| WO | WO2009/000966 | 12/2008 |

* cited by examiner

TOOL AND METHOD FOR EXPANDING A PIPE END

CROSS-REFERENCE TO RELATED APPLICATIONS

This application is the National Stage of International Application No. PCT/EP2011/063817, filed on Aug. 11, 2011, which claims the priority of European Application No. 10172913.5, filed on Aug. 16, 2010. The contents of both applications are hereby incorporated by reference in their entirety.

FIELD OF THE INVENTION

The invention relates to a tool for expanding a pipe end, the tool comprising a plurality of jaws, which are radially movable in relation to a center axis between a retracted position and an expanded position and which, when retracted, are intended to be inserted into the pipe end, wherein the movable jaws have outer jaw surfaces which are intended for engagement with the inner surface of the pipe end and which lie adjacent to one another in the retracted position of the jaws, a piston or cone with a tapered end for moving the jaws between said positions, and means moving the piston or cone in a reciprocating manner in the axial direction for expanding the pipe end.

Further, the invention relates to a method for expanding a pipe end with the aid of an expander tool, the expander tool comprising a plurality of jaws that are radially movable in relation to a center axis between a retracted and an expanded position, wherein said jaws have outer jaw surfaces which are intended for engagement with the inner surface of the pipe end and which lie adjacent to one another in the retracted position of the jaws, and a piston or a cone with tapered end for moving the jaws between said positions, whereby the piston or cone is moved in a reciprocating manner in the axial direction for expanding the pipe end.

Pipes are nowadays also made from a material, which has memory capacity, i.e. the pipe automatically strives to essentially return to its original shape and form after having been expanded. One example in this regard is pipes that are manufactured from cross-linked polyolefins, such as cross-linked polyethylene PEX, which possesses active memory capacity at temperatures as low as room temperature. For such pipes, a pipe connection is established by expanding one end of the pipe and inserting into the widened pipe end a connector, which acts as a part of a pipe connecting piece and which is retained in said pipe end until the pipe is shrunk to an extent at which it is able to firmly grip the connecting piece. Optionally, a clamping sleeve made of a resilient material, for instance metal or plastic, which may be the same plastic material as the material from which the pipe is made, is expanded and shrunk over the pipe end in order to further enhance the holding and the sealing pressure in the pipe connecting region. The clamping sleeve can be expanded at the same time as the pipe end is expanded, with the clamping sleeve in position around said pipe end.

EP 0417674 discloses an expander tool for expanding a pipe end. The expander tool includes a number of jaws, which can be moved radially in relation to a center axis between a retracted position, in which the jaws lie close together, and an outer, pipe expanding position. The jaws have outer jaw surfaces, which are delimited by mutually opposing jaw edges and are intended for engagement with the inner surface of the pipe end and which are at least essentially circularly arcuate in shape when seen in cross-section. However, the opposing edges of the outer jaw surfaces tend to produce on the inner surface of the pipe end continuous grooves or score lines, which extend in the direction of the longitudinal axis of the pipe. When a fluid under pressure flows through a pipe connection that has been established by the expansion method, the fluid tends to follow the score lines and seep through the pipe connection. Thus, the tightness of the joint is not adequate.

EP 0 682 758 discloses a corresponding expander tool also comprising recesses on the outer surface of the jaws. These recesses cause promontories on the inner surface of the pipe by causing interruptions in the score lines that are liable to be formed by the jaw edges on the inner surface of the pipe end during the final stage of the pipe end expansion process. However, the result is that the inner surface of the pipe end is not even, whereby the pipe connection is not always tight enough.

WO 95/10 000 discloses an expander tool in which the radial distance of the outer jaw surfaces from the center axis increases from the insertion end of said jaws to their opposite end. The pipe end is expanded in stages, i.e. the mutually retracted jaws are inserted to a given distance in the pipe end and then brought to an expanded state while expanding the pipe end to a relatively small extent, whereafter the jaws are again brought together or retracted and inserted further into the pipe end. The jaws are then again brought to an expanded state while further expanding the pipe end. The method is repeated until the pipe end has been expanded to the extent desired, for instance until the outer jaw surfaces have been inserted at full length into the pipe end and brought to an expanded state, whereupon the jaws are withdrawn from said pipe end after having been returned to the retracted state or position. However, using the tool requires carefulness and quite high skills in order to ensure that the connection is tight enough.

EP 1 118 401 discloses an expander tool in which the jaws are mounted in a bushing. The jaws are brought to an expanded state by a tapered piston. The bushing and thereby the jaws are axially movable. When the jaws are moved axially closer to the piston, the expanded state of the jaws is larger. Thus, the axial displacement of the jaws allows widening of the pipe end in stages. However, the structure of the expander tool is rather complicated and it is quite difficult to manufacture the tool and use the tool to achieve a tight enough connection.

WO 2009/000 966 discloses an expander tool comprising a plurality of jaws that are radially movable between a retracted and an expanded position. The jaws have outer jaw surfaces which are intended for engagement with the inner surface of the pipe end and which lie adjacent to one another in the retracted position of the jaws and have an at least generally circular arcuate shape in cross-section. The expander tool further comprises a piston or cone with a tapered end for moving the jaws between the retracted and the outer expanded positions and the piston is moved in a reciprocating manner in the axial direction before expanding the pipe end gradually in the stages. The axial reciprocating movement of the piston is guided to rotate the jaws to a certain extent in a circumferential direction after each expansion stage.

BACKGROUND OF THE INVENTION

Brief Description of the Invention

The object of the invention is to provide a new tool and method for expanding pipe ends.

The tool of the invention is characterized in that the tool comprises support structures for supporting the jaws in a circumferential direction in their expanded position.

Further, the method of the invention is characterized in that the jaws are supported in a circumferential direction in the expanded position.

According to an embodiment a pipe end is expanded by an expander tool comprising a plurality of jaws, which are radially movable in relation to a center axis between a retracted position and an expanded position. The jaws when retracted are intended to be inserted into the pipe end. The jaws have outer jaw surfaces which are intended for engagement with the inner surface of the pipe end and which lie adjacent to one another in the retracted position of the jaws. The tool further comprises a piston or a cone with a tapered end for moving the jaws between said positions and means moving the piston or the cone in a reciprocating manner in the axial direction for expanding the pipe end. Yet further the tool comprises support structures, whereby the jaws are supported in a circumferential direction in the expanded position. Thus, in the expanded position the jaws are prevented from moving in the circumferential direction. Thus, the gap between the edges of the jaws in the expanded position remains equal when compared to the other gaps. Thus, the solution provides same gap distance all around the tool and the jaws are thereby uniformly expanding the pipe. These features provide the advantages of improvement in tightness of the connection and thus less leakages in the connection. Yet further, a reduction in time to tightness and also a reduction in the variation of tightening time are achieved.

BRIEF DESCRIPTION OF THE DRAWINGS

The invention is further described in the attached drawings, in which.

For the sake of clarity, the figures show some embodiments of the invention in a simplified manner. In the figures, like reference numerals identify like elements.

DETAILED DESCRIPTION OF THE INVENTION

Figure 1:
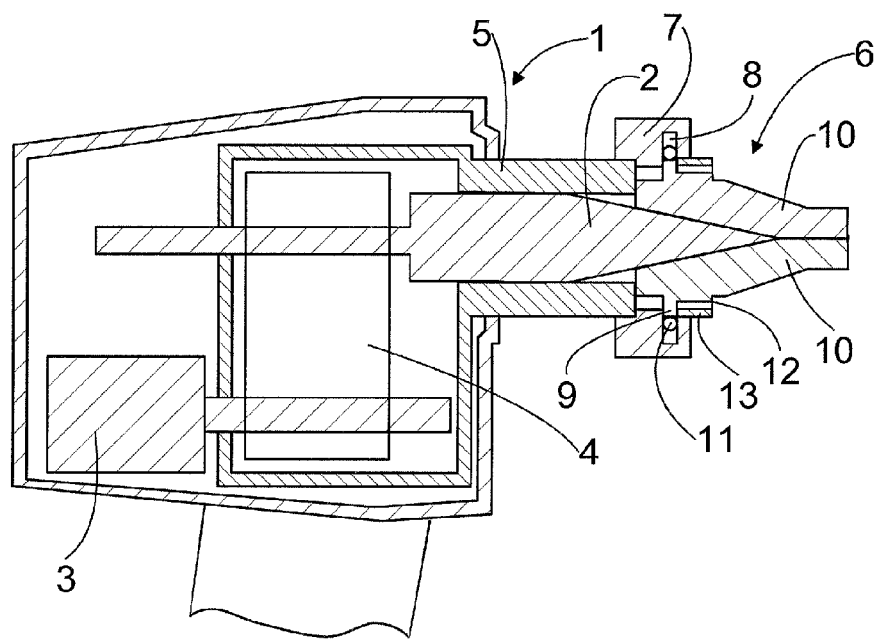
FIG. 1 is a schematic cross-sectional side view of an expander tool.

FIG. 1 shows an expander tool 1. The expander tool 1 comprises a piston 2 that has a tapered end. The piston 2 is moved in a reciprocating manner in the axial direction by means of an electric motor 3. The piston 2 only moves in the axial direction, and so it does not rotate. The power of the electric motor 3 is transferred to move the piston 2 by using a gearbox 4. The expander tool can also be formed such that the reciprocating movement of the piston is achieved by manual, pneumatic, hydraulic or any other suitable means.

The expander tool 1 comprises a housing 5 in which the piston 2 can be moved in a reciprocating manner. An expander head 6 is attached to the housing 5.

The expander head 6 comprises a screw-on cover 7, which is attached to the threads on the outer surface of the housing 5. The cover 7 includes a through-penetrating central opening and a circular groove 8, in which radial parts 9 of segments or jaws 10 are received in a manner which will permit the jaws 10 to move radially but not axially relative to the ring groove 8. The radial parts 9 are provided with peripheral grooves, which receive an annular spring 11, which surrounds the jaws 10 and which endeavours to hold the jaws in their retracted state or in a position in which they lie against the piston end 2.

The tool is expanded by moving the piston 2 forwards from its withdrawn position, whereby the tapered end of the piston 2 engages with bevelled surfaces on the jaws 10 and forces the jaws 10 apart. The number of jaws 10 may be, for example, 6 or any other suitable number. The jaws 10 move radially outwards in relation to a center axis of the piston 2. The jaws 10 have outer jaw surfaces which, when seen in cross-section at a right angle to the piston axis, are at least generally arcuate in shape and lie adjacent to one another when the jaws 10 are in a retracted state or position.

The radial distance of the respective outer jaw surfaces from the center axis of the piston increases from their forward ends or insertion ends to their opposite or rear ends. This increase in distance can be effected continuously, as shown in FIG. 1, or stepwise.

When expanding one end of a pipe which is made of a material having memory capacity, the jaws 10 are contracted so that the outer diameter of the insertion end of the tool will be smaller than or essentially equal to the inner diameter of the pipe end to be expanded. The insertion end of the tool is inserted into said pipe end along a distance which is much shorter than the full length of the jaws 10. The jaws 10 are moved apart and then returned to the retracted position and the tool is then moved further into the now slightly expanded pipe end. The procedure is repeated until the pipe end is in abutment with a step 12 of the jaw 10. The steps 12 in the jaws 10 thus form a stop edge for the pipe. A pipe connecting piece can be inserted into the widened pipe end after removing the jaws 10 therefrom and the pipe end is crimped around said connecting piece.

The expander head 6 comprises a sleeve 13 which is attached to the threads on the inner surface of the cover 7. The sleeve 13 is positioned around the jaws 10. The structure of the sleeve 13 is more clearly seen in FIG. 2 and especially in FIG. 3.

Figure 2:
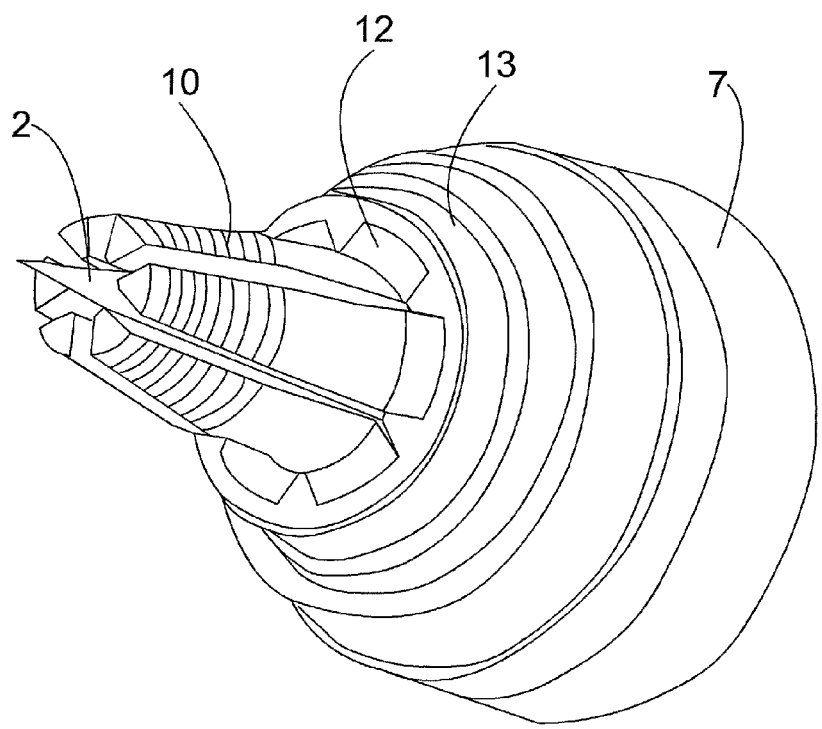
FIG. 2 is a schematic view of an end of an expander head.
Figure 3:
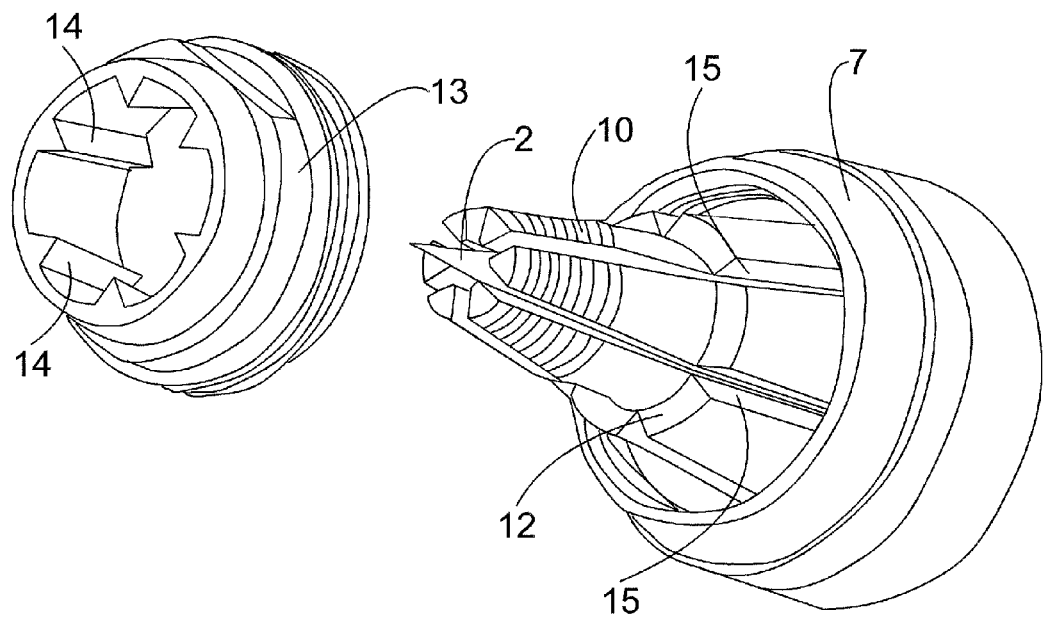
FIG. 3 is a schematic view of the expander head according to FIG. 2 a sleeve disengaged.

In FIGS. 2 and 3 the piston 2 is moved such that the jaws are in their outer expanded position. The sleeve 13 comprises support surfaces 14 which support the jaws in a circumferential direction in their expanded position. Each jaw 10 comprises jaw edges 15, which lie against the support surfaces 14. Preferably the support surfaces 14 are formed such that they support the jaw edges 15 already when they are moving towards their expanded position. Preferably also the jaw edges 15 form a surface extending in the radial direction of a corresponding jaw 10 such that the surface of the jaw edge 15 lies against a corresponding surface of a support surface 14 when the jaws 10 are moving towards their expanded position. Thus, preferably the support surfaces 14 are so long that they start to support the jaws in a circumferential direction immediately when the jaws 10 start to move from their retracted position towards their expanded position.

When the jaws 10 are supported in a circumferential direction the gap between each jaw is kept equal. Thus, the structure of the tool is kept symmetrical although the jaws are in their expanded position whereby the pipe end is expanded symmetrically.

Figure 4:
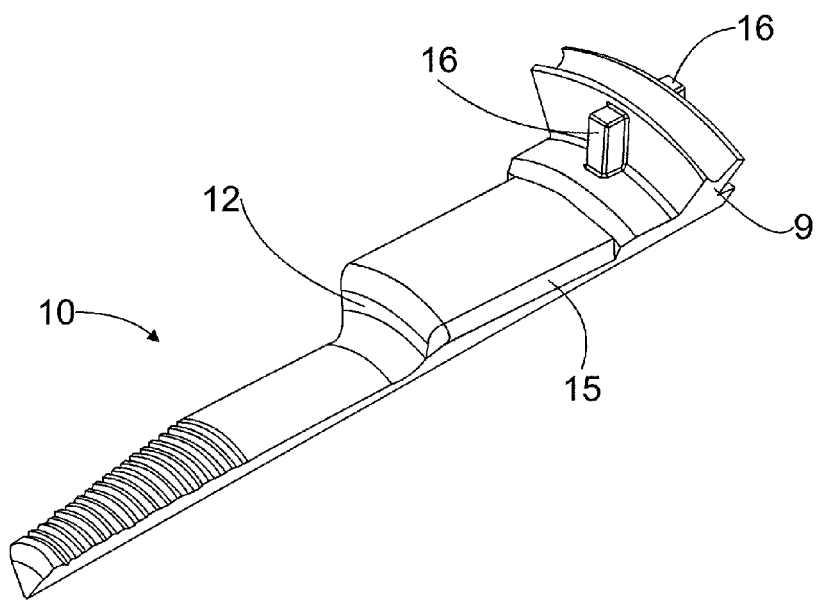
FIG. 4 is a schematic view of a jaw.

In the embodiment shown in FIG. 4 the radial part 9 of the jaw 10 is provided with protrusions 16. The protrusion 16 can be formed at the front side of the radial part 9 or at the back side of the radial part 9 or both as shown in FIG. 4. Of course the groove of the cover 7 is provided with corresponding grooves for the protrusions 16. The sides of the grooves and the sides of the protrusions 16 form support surfaces in a radial direction of a corresponding jaw 10 whereby these support surfaces support the jaws in a circumferential direction.

Figure 5:
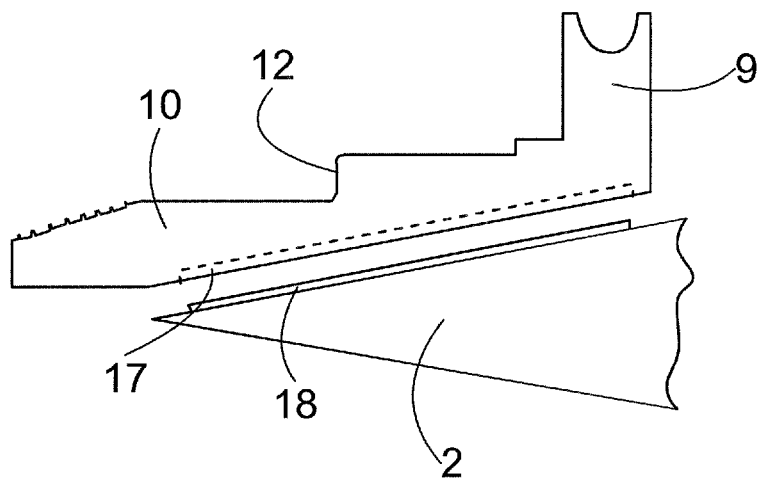
FIG. 5 is a schematic side view of a cone and a jaw.
Figure 6:
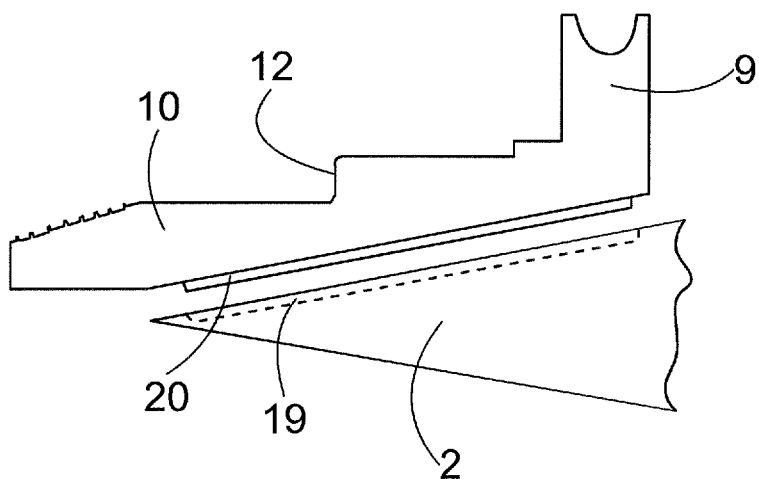
FIG. 6 is a schematic side view of a cone and a jaw according to another embodiment.

FIGS. 5 and 6 show embodiments in which the jaws 10 are supported from their inside. In FIG. 5 the jaw 10 is provided with a groove 17 and the cone 2 is provided with corresponding protrusions 18. If each jaw is provided with one groove 17 the number of the protrusions 18 in the cone 2 corresponds to the number of the jaws 10.

In the embodiment shown in FIG. 6 the jaw 10 is provided with a protrusion 20 and the cone 2 is provided with the corresponding grooves 19. When the jaws 10 and the cone 2 are provided with grooves and corresponding protrusions the jaws are supported in the circumferential direction all the time i.e. when the jaws are in their retracted position and in their expanded position and between said positions. For the sake of clarity the jaw 10 and the cone 2 are shown in FIGS. 5 and 6 separated but of course in the expander tool the cone 2 and the jaws 10 contact each other essentially continuously. It is also possible to combine the structures shown in FIGS. 5 and 6 such that both the jaws 10 and the cone 2 comprise both grooves and protrusions.

In some cases the features disclosed in the present application may be used as such, irrespective of other features. On the other hand, the features set forth in the present application may, when necessary, be combined in order to provide different combinations.

It will be obvious to a person skilled in the art that, as the technology advances, the inventive concept can be implemented in various ways. The invention and its embodiments are not limited to the examples described above but may vary within the scope of the claims. Preferably the pipe end is expanded gradually in stages and after each expansion the jaws are rotated in the circumferential direction i.e. the position of the jaws in the circumferential direction is changed after each expansion stage. The change of the position can be made manually by rotating the tool or the tool can comprise a structure which causes the rotation of the jaws. Thereby the reciprocating motion of the piston is controlled to rotate the jaws to a certain extent in the circumferential direction.

The invention claimed is:

1. A tool for expanding a pipe end, the tool comprising
   a plurality of jaws, which are radially movable in relation to a center axis between a retracted position and an expanded position and which, when retracted, are intended to be inserted into the pipe end, wherein the movable jaws have outer jaw surfaces which are intended for engagement with the inner surface of the pipe end and which lie adjacent to one another in the retracted position of the jaws,
   a piston or cone with a tapered end for moving the jaws between the retracted position and the expanded position,
   a mechanism for moving the piston or cone in a reciprocating manner in the axial direction for expanding the pipe end, and
   a sleeve around the moveable jaws, the sleeve including radially extending support surfaces and each jaw including jaw edges which lie against the radially extending support surfaces when the movable jaws are moving towards their expanded position.

2. A tool according to claim 1, wherein the jaw edges form surfaces extending in the radial direction of a corresponding jaw and lying against the support surfaces when moving towards their expanded position.

3. A tool according to claim 1, wherein the jaw edges lying against corresponding support surfaces are formed such that they start at a distance from the tip of the jaw such that a step is formed in the jaw.

4. A tool according to claim 3, wherein the step forms a stop edge for the pipe.

5. A tool according to claim 1, wherein the jaw edges lying against corresponding support surfaces are formed such that they start at a distance from the tip of the jaw such that a step is formed in the jaw.

6. A tool according to claim 5, wherein the step forms a stop edge for the pipe.

7. A tool according to claim 1, wherein the piston or cone comprises protrusions and each jaw comprises a corresponding groove whereby the grooves and protrusions form the support structures.

8. A tool according to claim 1, wherein each jaw comprises a protrusion and the piston or cone is provided with corresponding grooves whereby the grooves and protrusions form the support structures.

9. A method for expanding a pipe end with the aid of an expander tool, the expander tool comprising
   a plurality of jaws that are radially movable in relation to a center axis between a retracted position and an expanded position, wherein said jaws have outer jaw surfaces which are intended for engagement with the inner surface of the pipe end and which lie adjacent to one another in the retracted position of the jaws, and
   a piston or a cone with tapered end for moving the jaws between the retracted position and the expanded position,
   whereby the piston or cone is moved in a reciprocating manner in the axial direction for expanding the pipe end,
   wherein the jaws are supported in a circumferential direction in the expanded position by radially extending jaw edges lying against radially extending support surfaces of a sleeve, which is positioned around the jaws.

10. A method according to claim 9, wherein the jaws are supported in the circumferential direction also when they are moved from the retracted position to the expanded position.

* * * * *